(12) United States Patent
Schofalvi

(10) Patent No.: US 6,204,316 B1
(45) Date of Patent: Mar. 20, 2001

(54) BINDER SYSTEM METHOD FOR PARTICULAR MATERIAL

(75) Inventor: Karl-Heinz Schofalvi, South Euclid, OH (US)

(73) Assignee: Stanton Advanced Materials, Inc., Richmond Hts., OH (US)

( * ) Notice: Subject to any disclaimer, the term of this patent is extended or adjusted under 35 U.S.C. 154(b) by 0 days.

(21) Appl. No.: 09/488,907

(22) Filed: Jan. 21, 2000

Related U.S. Application Data

(63) Continuation of application No. 09/291,904, filed on Apr. 14, 1999.
(60) Provisional application No. 60/083,184, filed on Apr. 27, 1998.

(51) Int. Cl.[7] ............................. C08K 5/16; C08K 5/17; C08K 5/33
(52) U.S. Cl. ............................. 524/198; 524/236; 523/1
(58) Field of Search ............................. 523/1; 524/198, 524/236

(56) References Cited

U.S. PATENT DOCUMENTS

| | | |
|---|---|---|
| 3,933,941 | 1/1976 | Yonemitsu et al. . |
| 4,197,118 | 4/1980 | Wiech, Jr. . |
| 4,265,794 | 5/1981 | Pett et al. . |
| 4,283,360 | 8/1981 | Henmi et al. . |
| 4,305,756 | 12/1981 | Wiech, Jr. . |
| 4,456,713 | 6/1984 | French et al. . |
| 4,595,558 | 6/1986 | Baldwin et al. . |
| 4,602,953 | 7/1986 | Wiech, Jr. . |
| 4,624,812 | 11/1986 | Farrow et al. . |
| 4,638,029 | 1/1987 | Meschke et al. . |
| 4,734,237 | 3/1988 | Fanelli et al. . |
| 4,765,950 | 8/1988 | Johnson . |
| 4,814,370 | 3/1989 | Kramer et al. . |
| 4,891,399 | 1/1990 | Ohkawa et al. . |
| 4,898,902 | 2/1990 | Nagai et al. . |
| 5,002,988 | 3/1991 | Ono et al. . |
| 5,028,367 | 7/1991 | Wei et al. . |
| 5,030,677 | 7/1991 | Achikita et al. . |
| 5,066,625 | 11/1991 | Philipp . |
| 5,087,594 | 2/1992 | Kato et al. . |
| 5,098,942 | 3/1992 | Menke et al. . |
| 5,135,977 | 8/1992 | Achikita et al. . |
| 5,145,900 | 9/1992 | Sterzel et al. . |
| 5,155,158 | 10/1992 | Kim . |
| 5,250,251 | 10/1993 | Fanelli et al. . |
| 5,252,314 | 10/1993 | DeGuire et al. . |
| 5,254,613 | 10/1993 | Bayer et al. . |
| 5,256,451 | 10/1993 | Philipp et al. . |
| 5,266,264 | 11/1993 | Miura et al. . |
| 5,278,251 | 1/1994 | Ohtani et al. . |
| 5,280,086 | 1/1994 | Kawamoto et al. . |
| 5,281,650 | 1/1994 | Burk et al. . |
| 5,286,802 | 2/1994 | Uesugi et al. . |
| 5,298,654 | 3/1994 | DeGuire et al. . |
| 5,332,537 | 7/1994 | Hens et al. . |
| 5,342,563 | 8/1994 | Quinn et al. . |
| 5,362,791 | 11/1994 | Ebenhoech et al. . |
| 5,366,669 | 11/1994 | Quadir et al. . |
| 5,380,179 | 1/1995 | Nishimura et al. . |
| 5,395,654 | 3/1995 | Philipp et al. . |
| 5,397,531 | 3/1995 | Peiris et al. . |
| 5,417,756 | 5/1995 | Bayer et al. . |
| 5,421,853 | 6/1995 | Chen et al. . |
| 5,439,964 | 8/1995 | Ohst et al. . |
| 5,441,695 | 8/1995 | Gladden . |
| 5,585,428 | 12/1996 | Quinn et al. . |
| 5,641,920 | 6/1997 | Hens et al. . |
| 5,744,532 | 4/1998 | Kankawa et al. . |

*Primary Examiner*—Kriellion Sanders
(74) *Attorney, Agent, or Firm*—Renner, Otto, Boisselle & Sklar

(57) ABSTRACT

The present invention relates to a binder composition comprising a polycarbonate polymer; an ethylenebisamide wax; and a guanidine wetting agent. The present invention further relates to a method for forming a sintered part by powder injection molding, including the steps of forming a green composition comprising a binder and an inorganic powder, wherein binder is a composition comprising a polycarbonate polymer, an ethylenebisamide wax, and a guanidine wetting agent; melting the composition; injecting the composition into a mold for a part; heating the part to a temperature at which the binder decomposes; heating the part to a temperature at which the inorganic powder is sintered. The binder composition of the present invention is useful for press and sinter applications as well as for powder injection molding applications.

17 Claims, 5 Drawing Sheets

US 6,204,316 B1

BINDER SYSTEM METHOD FOR PARTICULAR MATERIAL

CROSS REFERENCE TO RELATED APPLICATIONS

This application is a continuation of Ser. No. 09/291,904, filed Apr. 14, 1999, which claims the benefit of U.S. Provisional Application No. 60/083,184 filed Apr. 27, 1998.

FIELD OF THE INVENTION

The present invention relates to binder compositions for use in forming sintered parts by powder injection molding and to green compositions of the binder composition and inorganic powders. The binders of the present invention require fewer steps to produce a part, have higher thixotropic energy, melt at a lower temperature, provide a green body having high strength, and decompose thermally in a clean, substantially ash-free burnout to yield simple, environmentally safe products.

BACKGROUND OF THE INVENTION

Processes for forming shaped articles from particulate mixtures are known in the art. Classically, a desired particulate material is mixed with a binder and then formed into the desired shape, this being called a green body. The green body is then fired to provide a fusion of the particulate material and to drive off the binder, thereby producing the desired shaped product with proper surface texture, strength, etc. Modern methods include press and sinter (P&S) and powder injection molding (PIM). In P&S, a mixture of one or more of a metal, metal oxide, intermetallic or ceramic powder and a small amount of binder (about 5% of the powder volume) are placed in a relatively simple mold, pressed into a green body, and then sintered. The small amount of binder is decomposed during the sintering step, so a separate step of removing the binder is not necessary. However, P&S is limited to simple parts.

In PIM, a mixture of one or more of a metal, metal oxide, intermetallic or ceramic powder and a quantity of binder from 30% to 60% of the volume of powder are heated to a liquid state and then injected under pressure into a mold to form a part. Once in the mold, the binder is removed in one or more separate steps and the part is fired to sinter the particles into a solid part. PIM is capable of producing quite complex parts.

In the production of shaped objects by PIM in the manner above described, it has been found that the binder, while necessary to the process, creates problems. The binder must be used in order to form an object of practical use, but most of it must be removed before the part can be sintered, although in some cases a portion of the binder remains until sintering is completed.

Direct removal of the PIM binder during sintering is problematic. Many binders leave behind ash upon decomposition. When such ash combines with certain ingredients in the powder component, eutectic mixtures may be formed. Such eutectic compounds as TiC may be formed from titanium and carbon ash, and these can result in serious problems in the formed part.

Thermoplastic binders which decompose on heating have been used. However, these materials tend to soften or melt first and then decompose, creating problems on decomposition. Thermoplastic materials have been tried which decompose below their melting point and thereby remain in place until decomposition. Binders have been removed by exposure to a decomposing atmosphere, such as an acid atmosphere to decompose an acid-labile organic binder. The drawback of this approach is the use of an acid atmosphere, requiring a special chamber and hazardous material handling capabilities. Similar binders which are subject to catalytic decomposition have been used, such as a polyacetal. The drawback of this approach is that the decomposition product is formaldehyde, which also requires special equipment to collect and decompose the formaldehyde.

The prior art has recognized this problem and has therefore attempted to remove the binder from the shaped green body prior to the step of firing. Such processes have used various solvents, including organic solvents, triple-point CO2, and water to dissolve and remove the binder. While systems using such procedures can provide advantages over procedures wherein the binder is removed during firing, articles formed by removing the binder prior to firing still have the tendency to crack during the binder removal as well as during the firing operation. One reason for this is that the binder is removed from the green body by means of a solvent when the binder is In the solid state, and upon dissolution the binder, the binder-solvent mixture has a tendency to expand. This problem has been approached by various means, including heating the green body prior to exposing it to the solvent, by using a solvent to remove a portion of the binder and removing the remainder by firing, and by using a two-part binder, each part of which is soluble in a different solvent, so each solvent removes a portion of the binder, and by using the different solvents in a stepwise manner, Each of these methods includes its own drawbacks.

Thus, the need remains for binders which are useful, particularly in powder injection molding, which require a minimum number of steps to remove, which have high thixotropic energy, which melt at a low temperatures, which provide a green body having high strength, and which decompose thermally to yield simple, environmentally safe products, substantially free of ash, thereby yielding a binder which performs its function but which provides a process of powder injection molding which proceeds with a minimum number of process steps, can be carried out in an air atmosphere in many cases, and does not leave behind deleterious residues, either in the part or in the environment. The present invention requires only simple, standard equipment which is inexpensive and commonly available. The steps of debinding and sintering may be carried out in the same equipment, on a continuous basis, thereby avoiding downtime for cooling and transfer from debinding equipment to sintering equipment.

SUMMARY OF THE INVENTION

The present invention relates to a binder composition comprising a polycarbonate polymer; an ethylenebisamide wax; and a guanidine wetting agent. The present invention further relates to a method for forming a sintered part by powder Injection molding, including the steps of forming a green composition comprising a binder and an inorganic powder, wherein binder is a composition comprising a polycarbonate polymer, an ethylenebisamide wax, and a guanidine wetting agent; transferring the green composition into a mold for a part; heating the part to a temperature at which the binder decomposes; and heating the part to a temperature at which the inorganic powder is sintered.

Thus, the binder composition and method of making sintered parts using the binder composition of the present invention provide the features missing from the prior art. The binder composition may be removed in a minimum number of steps, has high thixotropic energy, melts and becomes flowable at a low temperature, provides a green body having high strength, and decomposes thermally to yield simple, environmentally safe products, substantially free of ash. The binder composition thereby performs its function while providing a process of powder injection molding which proceeds with a minimum number of steps, can be debound in air, hydrogen, oxygen, argon, nitrogen and similar gas atmospheres or in vacuum, and does not leave behind deleterious residues, either in the part or in the environment.

DETAILED DESCRIPTION

Figure 1:
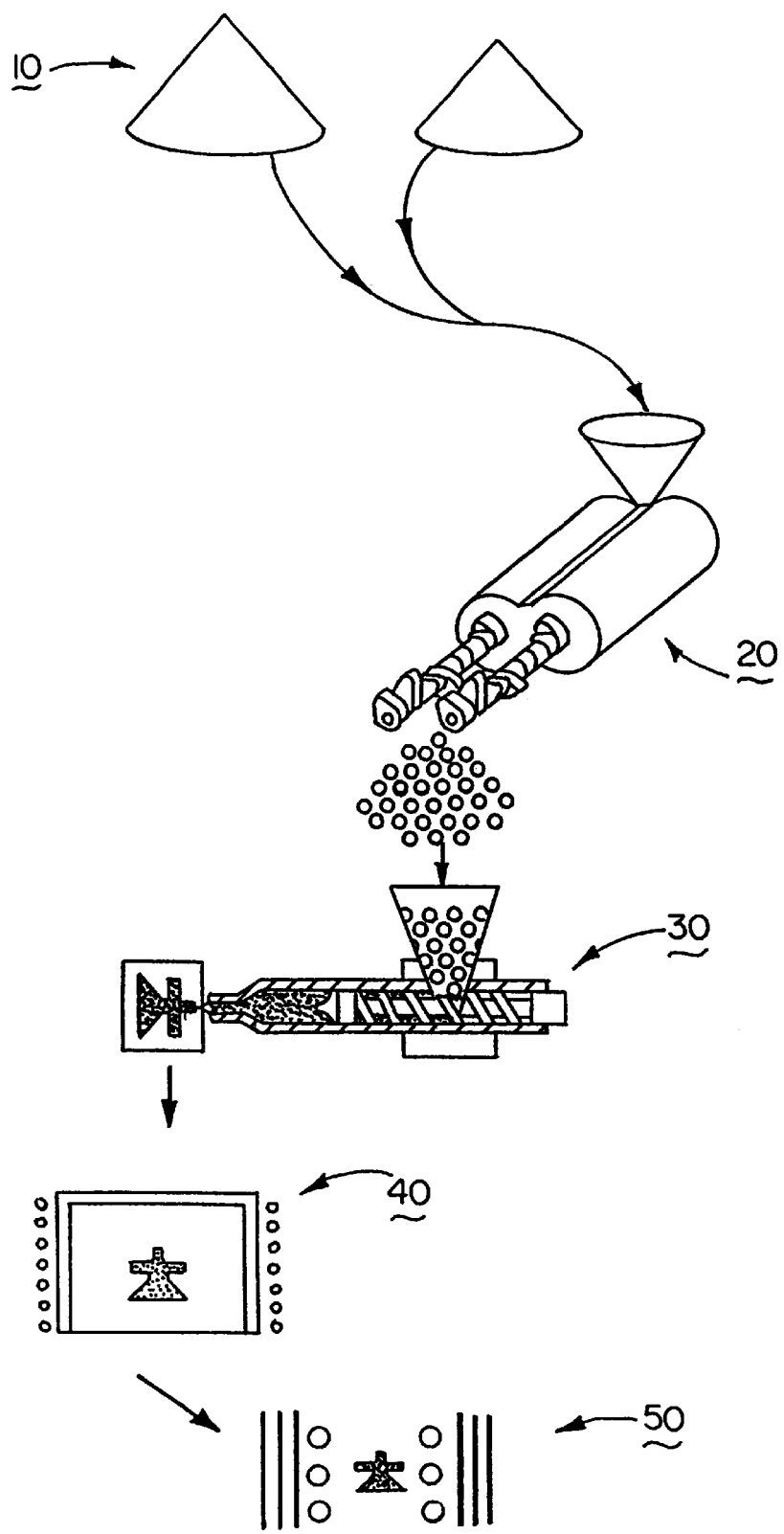
FIG. 1 is a schematic diagram of the steps in a method of making a part by powder injection molding in accordance with the present invention.

The binder composition and the green composition comprising the binder composition and an inorganic powder, each in accordance with the present invention, are applicable both to powder injection molding (PIM) techniques and to press and sinter (P&S) applications. In PIM, a green composition or feedstock comprising an inorganic powder and a binder composition is used for powder injection molding, which includes steps of debinding and sintering. In P&S applications, a green composition comprising an inorganic powder and a binder composition are pressed into a mold and sintered to form a part, without a step of debinding. The inorganic powders which may be used in the green compositions and method of the present invention may be metal, metal oxide, intermetallic and/or ceramic, or mixtures of these, depending upon the desired characteristics of the final product. The green composition comprising an inorganic powder and binder composition of the present invention, may be injection molded with an increased loading of the powder compared to prior processes, resulting in less shrinkage and deformation during debinding and sintering. The components of the binder composition allow debinding of the nascent part with decomposition of the binder to yield environmentally safe products in a relatively rapid, controllable process, thereby efficiently overcoming the deficiencies of the prior art.

The components of the binder composition are partially miscible with one another, such that when the green composition is ready for use, the components thereof are sufficiently miscible that the desired parts are formed when the composition is pumped into the mold, but the components are sufficiently immiscible that the phases can separate and the components will "come apart" in a step-wise, controllable manner in an oven or kiln during the debinding step. The binder composition of the present invention may be removed thermally, in the same oven or chamber in which the part is sintered, thereby avoiding a multiple oven, multiple step process of debinding and sintering the part.

The present inventor has discovered that the components of the binder composition controllably debind in an order which is the opposite of that normally sought in the PIM industry. In conventional binder compositions, which include, e.g., stearic acid as a surface agent, paraffin wax as the wax, and polypropylene as the major binder component, during the debinding step of a PIM process, the surface agent releases first, the wax component releases next, and the major binder component releases last.

The components of the binder composition of the present invention, in contrast, release in the opposite order. In the binder composition of the present invention, the major binder component, a polycarbonate polymer, has a decomposition temperature of about 185° C. The wax component, an ethylenebisamide wax, has a decomposition temperature of about 285° C. The guanidine wetting or surface agent is the last component to decompose, having a decomposition temperature in the range of about 350° C. to about 450° C. Thus, according to the present invention, during the debinding step of a PIM process, the components of the binder composition debind in an order opposite to that of conventional binder compositions.

As a result of the debinding profile of the binder composition according to the present invention, the surface agent, is the last to decompose in the debinding step. As a result, the inorganic powder is retained in position for a longer time in the pre-sintering portion of the process. Retaining the inorganic powder particles in position for a longer time provides the benefit of allowing the transition from debinding to sintering to occur with a significantly reduced possibility that the inorganic powder particles will move or be distorted from their original position in the mold. As a result, superior sintered parts are obtained from the PIM process using the binder composition of the present invention.

The partial miscibility of the components of the binder composition facilitates the reverse debinding of the present invention. Since the polycarbonate polymer is only partially miscible with the other components and has a lower glass transition ($T_g$) and melting or decomposition temperature, it can melt and separate from the other components of the binder composition, then wick out of the green part first. When the polycarbonate component has been removed, the temperature may be raised to a temperature at which the next component may be debound. In the present invention, the ethylenebisamide is the next component to decompose or be debound. Again the partial miscibility of the components aids the separation, allowing the ethylenebisamide to decompose with affecting the guanidine wetting agent. When the ethylenebisamide has been removed, only the guanidine wetting agent remains. At this time, the temperature is again increased to the decomposition temperature of the guanidine wetting agent, which is in the range from about 350° C. to about 450° C., depending on the exact nature of the guanidine wetting agent, i.e., which acid has been reacted with guanidine to form the guanidine wetting agent, Once the guanidine wetting agent has been debound, the remaining Inorganic powder may be sintered to form the desired final part.

The binder composition of the present invention comprises a polycarbonate polymer, a wax such as ethylenebisamide wax, and a guanidine wetting agent. Each of these three general component materials is more fully disclosed in the following.

GUANIDINE WETTING AGENT

In one embodiment, the guanidine wetting agent is a reaction product of guanidine and an acid selected from a fatty acid, an organic acid, acid and a stronger acid such as an alkyl sulfonic acid. The guanidine wetting is a reaction product which may be an amide or actually may be more in the nature of a hydrated salt. For example, according to the CRC Handbook of Chemistry and Physics, 74$^{th}$ Ed., guanidine acetate has the formula $(H_2N)_2C=NH \cdot CH_3COOH$, rather than an amide-type formula such as $H_2N-C=NH$ $(NH)COCH_3$, as would be expected for an amide. This is due to the fact that guanidine is a very strong base, and is much more likely to simply abstract a proton from a relatively weak organic acid, rather than react with the organic acid in a "standard" amidization reaction forming an amide with concomitant loss of $H_2O$. However, in some cases, the reaction of guanidine and the acid may yield an amide in the "standard" manner. For this reason, the guanidine surface agent of the present invention will be referred to herein as the reaction product of guanidine and an acid. The term "reaction product of guanidine and an acid" includes both of the above-described forms of the product of a reaction between or mixture of guanidine and an acid, and mixtures of these forms or other possible forms.

The particular acid used to make the reaction product of guanidine and an acid is selected based upon the surface charge of the inorganic powder with which the binder composition is to be used. In one embodiment, the guanidine wetting agent is guanidine stearate. Guanidine stearate and guanidine compounds of similar acids are selected for use with powders having a positive surface charge and an isoelectric point at a low pH. In one embodiment, the guanidine wetting agent is guanidine ethyl-hexanoate. Guanidine ethyl-hexanoate and guanidine compounds of similar acids are selected for use with powders having an amphoteric surface charge, and an isoelectric point at a near-neutral pH. In one embodiment, the guanidine wetting agent is guanidine lauryl sulfonate. Guanidine lauryl sulfonate and guanidine compounds of similar acids are selected for use with powders having a negative surface charge, and an isoelectric point at a high pH. In other embodiments, the guanidine wetting agent may be the reaction product of guanidine and other acids. The selection of the appropriate acid for preparation of the reaction product of guanidine and an acid depends upon the isoelectric point of the inorganic powder. The relationship is further described in the following detailed description. The many acids which may be reacted with the guanidine to form the reaction product of guanidine and an acid are described in detail hereafter.

In general, the appropriate acid depends on the surface charge, or point of zero charge (PZC), which may be expressed as the isoelectric point (IEP) of the inorganic powder with which the binder composition is to be used in the green composition. Isoelectric points may be found in reference sources, or may be determined experimentally, by determining the pH at which no charge exists on the powder particle. The point of zero charge is the average of the pK's for the particular powder, and indicates the average acid-base character of the surface. Isoelectric points of a number of ceramic oxide materials are shown in the following table:

TABLE

Isoelectric Points of Oxides

| Material | Nominal Composition | IEP |
|---|---|---|
| Muscovite | $KAl_3Si_3O_{11}H_2O_{11}$ | 1 |
| Quartz | $SiO_2$ | 2 |
| Delta manganese oxide | $MnO_2$ | 2 |
| Soda lime silica glass | 1.00 $Na_2O$ 0.58 CaO 3.70 $SiO_2$ | 2–3 |
| Aibite | $Na_2O\ Al_2O_3\ 6\ SiO_2$ | 2 |
| Orthoclase | $K_2O\ Al_2O_3 6\ SiO_2$ | 3–5 |
| Silica (amorphous) | $SiO_2$ | 3–4 |
| Zirconia | $ZrO_2$ | 4–5 |
| Rutile | $TiO_2$ | 4–5 |
| Tin Oxide | $SnO_2$ | 4–7 |
| Apatite | 10 CaO 6 $PO_2$ 2 $H_2O$ | 4–6 |
| Zircon | $SiO_2\ ZrO_2$ | 5–6 |
| Anatase | $TiO_2$ | 6 |
| Magnetite | $Fe_3O_4$ | 6–7 |
| Hematite | $\alpha F_3O_3$ | 6–9 |
| Goethite | FeOOH | 6–7 |
| Gamma iron oxide | $\gamma Fe_2O_3$ | 6–7 |
| kaolin (edges) | $Al_2O_3\ SiO_2\ 2\ H_2O$ | 6–7 |
| Chromium oxide | $\alpha Cr_2O_3$ | 6–7 |
| Mullite | $3\ Al_2O_3\ 2\ SiO_2$ | 7–8 |
| Gamma alumina | $\gamma Al_2O_3$ | 7–9 |
| Alpha alumina | $\alpha Al_2O_3$ | 9–9.5 |
| Alumina (Bayer process) | $Al_2O_3$ | 7–9.5 |
| Zinc oxide | $ZnO_2$ | 9 |
| Copper oxide | CuO | 9 |
| Barium carbonate | $BaCO_3$ | 10–11 |
| Yttria | $Y_2O_3$ | 11 |
| Lathanum oxide | $La_2O_3$ | 10–12 |
| Silver oxide | $Ag_2O$ | 11–12 |
| Magnesium Oxide | MgO | 12–13 |

Source: Temple C. Patton, Paint Flow and Pigment Dispersion, Wiley-Interscience. New York, 1979; E. G. Kelly and D. J. Spottiswood, Introduction to Mineral Processing, Wiley-Interscience, New York, 1982; 1. M. Cases, Silic. Ind., 36, 145 (1971); R. H. Toon, T. Salman, and G. Donnay, J. Colloid Interface Sci., 70, 483 (1979).

According to the present invention, the reaction product of guanidine and organic acids in the $C_{12}$ to $C_{22}$ range are used with materials having a low isoelectric point, i.e., which have a low pH at the point of zero charge. Thus, for example the reaction product of guanidine and oleic acid ($C_{17}H_{33}CO_2H$) would be suitable for use with quartz powder ($SiO_2$), which has an IEP of 2, according to Table 1 above. Other suitable acids for use with inorganic powders having a low isoelectric point include such saturated fatty acids as (common names in parentheses) dodecanoic (lauric) acid, tridecanoic (tridecylic) acid, tetradecanoic (myristic) acid, pentadecanoic (pentadecylic) acid, hexadecanoic (palmitic) acid, heptadecanoic (margaric) acid, octadecanoic (stearic) acid, eicosanoic (arachidic) acid, 3,7,11,15-tetramethylhexadecanoic (phytanic) acid, monounsaturated, diunsaturated, triunsaturated and tetraunsaturated analogs of the foregoing saturated fatty acids.

According to the present invention, the reaction product of guanidine and organic acids in the $C_6$ to $C_{12}$ range are used with materials having a mid-range isoelectric point, i.e., which have a pH around 6 at the point of zero charge.

These materials may also be referred to as amphoteric. For example, the reaction product of guanidine and an organic acid such as ethylhexanoic acid ($C_7H_{15}CO_2H$) would be suitable for use with an inorganic powder having an IEP of about 6.0, for example with zircon ($SiO_2 \cdot ZrO_2$), which has an IEP of 5–6, or anatase ($TiO_2$), which has an IEP of 6, each according to Table 1 above. Hexanoic acid, heptanoic acid, octanoic acid, nonanoic acid, decanoic acid, dodecanoic acid are other straight-chain carboxylic acids which may be reacted with guanidine for use with inorganic powders having a mid-range isoelectric point. Branched-chain carboxylic acids in the $C_6$ to $C_{12}$ range may also be used with materials having a mid-range isolectric point.

According to the present invention, the reaction product of guanidine and stronger acids such as sulfonates, phthalates, benzoates, phosphates and phenols are used with materials having a high isolectric point, i.e., which have a pH around 10–12 at the point of zero charge. For example, the reaction product of guanidine and an acid such as benzenesulfonic acid may be used with an inorganic powder such as silver oxide, which has an IEP of 11–12, as shown in Table 1 above.

According to the present invention, for materials having intermediate IEPs, such as, for example, mullite ($3Al_2O_3 \cdot 2SiO_2$), IEP=7–8, a mixture of guanidine wetting agents may be used. As an alternative, intermediate acids may be selected for reaction with guanidine. Thus, for example, if mullite is the inorganic powder, the guanidine wetting agent used in the binder composition therewith may be a mixture of the reaction product of guanidine and benzenesulfonic acid and the reaction product of guanidine and ethylhexanoic acid. Alternatively, for mullite, the guanidine wetting agent used in the binder composition therewith may be the reaction product of guanidine and a weaker acid such as benzoic acid may be used.

Similarly, according to the present invention, for materials having intermediate IEPs, such as, for example, amorphous silica ($SiO_2$), IEP=3–4, a mixture of guanidine wetting agents may be used. As an alternative, intermediate acids may be selected for reaction with guanidine. Thus, for example, if silica is the Inorganic powder, the guanidine wetting agent used in the binder composition therewith may be a mixture of the reaction product of guanidine and octadecanoic (stearic) acid and the reaction product of guanidine and ethylhexanoic acid. Alternatively, for silica, the guanidine wetting agent used in the binder composition therewith may be the reaction product of guanidine and dodecanoic acid may be used. Dodecanoic acid, $C_{11}H_{23}CO_2H$, appears in both groups of acids, those for use with the low IEP powders and those for use with intermediate IEP powders. The intermediate character of such an acid makes it suitable for use with an intermediate IEP powder.

While a certain amount of trial and error may be required to optimize the reaction product of guanidine and an acid for a particular inorganic powder, and particulary for a combination of inorganic powders, the selection can be guided by the foregoing disclosure. Thus, the low IEP powders work best with a "very fatty", relatively weak acid, intermediate IEP powders work best with a mid-range organic acid, and the high EIP powders work best with a stronger acid having relatively less organic character, such as an alkyl sulfonic acid. The acid selected should be rheologically compatible with the compounding and injection molding equipment. Some testing may be required in order to optimize the acid for reaction with guanidine to form the guanidine wetting agent for a given inorganic powder.

POLYCARBONATE POLYMER

In the binder composition of the present invention, the polycarbonate polymer is a low molecular weight polycarbonate polymer. In one embodiment, the polycarbonate polymer Is poly(propylene carbonate). Poly(propylene carbonate) is prepared from the reaction of carbon dioxide, CO2, and propylene oxide, $CH_2=C(O)CH_2$, as shown in the following:

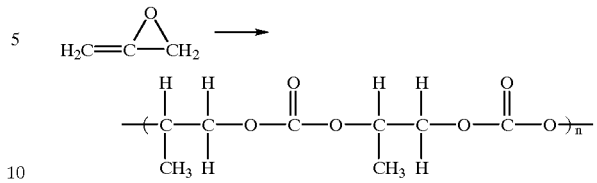

The poly (propylene carbonate) shown above, on application of sufficient heat, decomposes cleanly into the following, which is a liquid having a boiling point near the decomposition temperature of the poly (propylene carbonate):

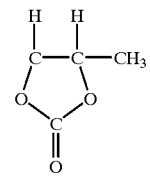

In one embodiment, the polycarbonate polymer has a number average molecular weight in the range from about 25,000 to about 75,000. In one embodiment, the polycarbonate polymer has a number average molecular weight in the range from about 35,000 to about 65,000. In one embodiment, the polycarbonate polymer has a number average molecular weight in the range from about 35,000 to about 40,000. In one embodiment, the polycarbonate polymer has a number average molecular weight of about 50,000. In one embodiment, the polycarbonate polymer has a number average molecular weight in the range from about 45,000 to about 55,000.

In one embodiment, the polycarbonate polymer is Q-PAC™ 40, available from PAC Polymers, a division of Axcess Corporation, Newark, DE. Q-PAC™ 40 is a low molecular weight polycarbonate, having a number average molecular weight in the range of about 50,000. Q-PAC™ 40 has a glass transition temperature, $T_g$=40° C. Q-PAC™ 40 is a low boiling liquid, having a boiling point of 242° C. Thus, at relatively moderate temperatures, Q-PAC™ 40 melts and may exit the green form as a liquid having only a slightly increased volume with respect to the solid, rather than decomposing into a gas having a greatly increased volume with respect to the solid. As above, the partial miscibility of the polycarbonate polymer allows it to melt and separate from the remaining components of the green composition during the debinding process.

The decomposition product of poly (propylene carbonate) is shown above. This cyclic propylene carbonate has a melting point below the temperature at which the polymer decomposes. Thus, as the binder composition of the present invention, when mixed with the inorganic powder to form the green composition and injected into a mold, is heated, the poly (propylene carbonate) first melts and then begins to decompose into the liquid cyclic propylene carbonate shown above. On further heating in the debinding process, the cyclic propylene carbonate decomposes cleanly in air to form $CO_2$ and water. Thus, according to the present invention, the polycarbonate polymer is the first component to be lost from the green composition in the debinding process. In contrast, in the prior art binders, the polymeric component has been designed to be the last component lost from the binder during the debinding process.

ETHYLENEBISAMIDE WAX

The binder composition of the present invention includes an ethylenebisamide wax. The ethylenebisamide wax is a wax formed by the amidization reaction of ethylene diamine and a fatty acid. The fatty acid may be in the range from $C_{12}$ to $C_{22}$, but is usually made from stearic acid, the saturated $C_{18}$ fatty acid. Thus, in one embodiment, the ethylenebisamide wax is ethylenebisstearamide wax. Ethylenebisstearamide has a discrete melting point of about 142° C. In one embodiment, the ethylenebisamide wax has a discrete melting point in the range from about 120° C. to about 160° C. In one embodiment, the ethylenebisamide wax has a discrete melting point in the range from about 130° C. to about 150° C. In one embodiment, the ethylenebisamide wax has a discrete melting point of about 140° C.

In one embodiment, the ethylenebisstearamide is ACRAWAX® C, available from LONZA, Inc. ACRAWAX® C has a discrete melt temperature of 142° C.

In other embodiments of the binder composition, other ethylenebisamides include the bisamides formed from the fatty acids ranging from $C_{12}$ to $C_{30}$. Illustrative of these acids are lauric acid, palmitic acid, oleic acid, linoleic acid, linolenic acid, oleostearic acid, stearic acid, myristic acid, and undecalinic acid. Unsaturated forms of these fatty acids may also be used.

QUANTITIES OF COMPONENTS IN THE BINDER AND GREEN COMPOSITIONS

It is a practice in the art of powder metal to refer to a binder composition in terms of parts by weight, or percent of each component on a weight basis, and to refer to a green composition in terms of parts by volume, or percent of each component on a volume bases. Thus, the amount of each component in the binder composition is expressed as weight percent, or wt %. The amounts of the inorganic powder and the binder composition combined to form the green composition are expressed as volume percent, or vol %. This practice is followed throughout the present specification and claims.

In one embodiment, the binder composition comprises the guanidine wetting agent in the range from about 5 wt % to about 30 wt % based on the binder composition, the polycarbonate polymer in the range from about 30 wt % to about 85 wt % based on the binder composition, and the ethylenebisamide wax in the range from about 10 wt % to about 40 wt % based on the binder composition. In one embodiment of the binder composition, the guanidine wetting agent is present at about 15.5 wt %, the polycarbonate polymer is present at about 59.4 wt %, and ethylenebisstearamide is present at about 25.1 wt %, each weight percent based on the binder composition. In one embodiment, the polycarbonate polymer is Q-PAC™ 40 brand of poly(propylene carbonate), and is present at about 60 wt %. In one embodiment, the ethylenebisamide is ACRAWAX® C brand of ethylenebisstearamide, and is present at about 25 wt %.

In one embodiment, the binder composition comprises the guanidine wetting agent in the range from about 10 wt % to about 25 wt % based on the binder composition, the polycarbonate polymer in the range from about 40 wt % to about 60 wt % based on the binder composition, and the ethylenebisamide wax in the range from about 15 wt % to about 35 wt % based on the binder composition.

The binder composition of the present invention may also be used for P&S applications. In such applications, the binder composition comprises the guanidine wetting agent in the range from about 5 wt % to about 30 wt % based on the binder composition, the polycarbonate polymer in the range from about 10 wt % to about 50 wt % based on the binder composition, and the ethylenebisamide wax in the range from about 30 wt % to about 70 wt % based on the binder composition.

The binder composition of the present invention is designed to be combined with an inorganic powder, to form a green composition for use in PIM. In one embodiment, the green composition includes the binder composition, as described above, and at least one inorganic powder selected from a metal powder, a metal oxide powder, a non-metallic powder and a ceramic powder. In one embodiment, the green composition includes the binder composition in an amount in the range from about 30 vol % to about 60 vol % and the inorganic powder or powders in an amount from about 70 vol % to about 40 vol %. In one embodiment, the green composition includes the binder composition in an amount in the range from about 40 vol % to about 50 vol % and the inorganic powder is present in an amount from about 60 vol % to about 50 vol %. In one embodiment, the green composition includes the binder composition in an amount of about 35 vol % and the inorganic powder in an amount of about 65 vol %.

The binder composition of the present invention is also suitable for use with an inorganic powder, to form a green composition for use in P&S. In one embodiment, the green composition includes the binder composition, as described above, and at least one inorganic powder selected from a metal powder, a metal oxide powder, a non-metallic powder and a ceramic powder. In one embodiment, the green composition includes the binder composition in an amount in the range from about 1 vol % to about 10 vol % and the inorganic powder or powders in an amount from about 99 vol % to about 90 vol %. In one embodiment, the green composition includes the binder composition in an amount in the range from about 2 vol % to about 5 vol % and the inorganic powder is present in an amount from about 98 vol % to about 95 vol %. In one embodiment, the green composition includes the binder composition in an amount of about 2.5 vol % and the inorganic powder in an amount of about 97.5 vol %.

INORGANIC POWDERS

Inorganic powders used in the present invention include metallic, metal oxide, intermetallic and/or ceramic powders. The powders may be oxides or chalcogenides of metallic or non-metallic elements. An example of metallic elements which may be present in the inorganic powders include calcium, magnesium, barium, scandium, titanium, vanadium, chromium, manganese, iron, cobalt, nickel, copper, zinc, yttrium, niobium, molybdenum, ruthenium, rhodium, silver, cadmium, lanthanum, actinium, gold or combinations of two or more thereof. In one embodiment, the inorganic powder may contain rare earth or ferromagnetic elements. The rare earth elements include the lanthanide elements having atomic numbers from 57 to 71, inclusive and the element yttrium, atomic number 39.

Ferromagnetic metals, for purposes of this invention, include iron, nickel, cobalt and numerous alloys containing one or more of these metals. In another embodiment, the metals are present as alloys of two or more of the aforementioned elements. In particular, prealloyed powders such as low alloy steel, bronze, brass and stainless steel as well as nickel-cobalt based super alloys may be used as inorganic powders.

The inorganic powders may comprise inorganic compounds of one or more of the above-described metals. The inorganic compounds include ferrites, titanates, nitrides, carbides, borides, fluorides, sulfides, hydroxides and oxides of the above elements. Specific examples of the oxide powders include, in addition to the oxides of the above-identified metals, compounds such as beryllium oxide, magnesium oxide, calcium oxide, strontium oxide, barium oxide, lanthanum oxide, gallium oxide, indium oxide, selenium oxide, zinc oxide, aluminum oxide, silica, zirconia, mullite, mica, indium tin oxide, rare earth oxides, titania, yttria, etc. Specific examples of oxides containing more than one metal, generally called double oxides, include perovskite-type oxides such as $NaNbO_3$, $SrZrO_3$, $PbZrO_3$, $SrTiO_3$, $BaZrO_3$, $BaTiO_3$; spinel-type oxides such as $MgAl_2O_4$, $ZnAl_2O_4$, $CoAl_2O_4$, $NiAl_2O_4$, $NiCr_2O_4$, $FeCr_2O_4$, $MgFe_2O_4$, $ZnFe_2O_4$, etc.; illmenite-types oxides such as $MgTiO_3$ $MnTiO_3$, $FeTiO_3$, $CoTiO_3$, $ZnTiO_3$, $LiTaO_3$, etc.; and garnet-type oxides such as $Gd_3Ga_5O_{12}$ and rare earth-iron garnet represented by $Y_3Fe_5O_{12}$. The inorganic powder may also be a clay. Examples of clays include kaolinite, nacrite, dickite, montmorillonite, montronite, spaponite, hectorite, etc.

An example of non-oxide powders include carbides, nitrides, borides and sulfides of the metals described above. Specific examples of the carbides include SiC, TiC, WC, TaC, HfC, ZrC, AlC; examples of nitrides include $Si_3N_4$, AlN, BN and $Ti_3N_4$; and borides include $TiB_2$, $ZrB_2$, $B_4C$ and $LaB_6$. In one embodiment, the inorganic powder is silicon nitride, silicon carbide, zirconia, alumina, aluminum nitride, barium ferrite, barium-strontium ferrite or copper oxide. In another embodiment, the powder is a semiconductor, for example, GaAs, Si, Ge, Sn, AlAs, AlSb, GaP, GaSb, InP, InAs, InSb, CdTe, HgTe, PbSe, PbTe, and any of the many other known semiconductors. In another embodiment, the Inorganic powder is alumina or clay.

ACIDS FOR REACTION WITH GUANIDINE

The acidic compounds useful in making the reaction product of guanidine and an acid of the present invention include carboxylic acids, sulfonic acids, phosphorus acids, phenols or mixtures of two or more thereof. Preferably, the acidic organic compounds are carboxylic acids or sulfonic acids. The carboxylic and sulfonic acids may have substituent groups derived from the above described polyalkenes. Selection criteria for the appropriate acid are provided above, based on the surface charge and isoelectric point of the inorganic powder used in preparing the green composition.

The carboxylic acids may be aliphatic or aromatic, mono- or polycarboxylic acid or acid-producing compounds. The acid-producing compounds include anhydrides, lower alkyl esters, acyl halides, lactones and mixtures thereof unless otherwise specifically stated.

Illustrative fatty carboxylic acids include palmitic acid, stearic acid, myristic acid, oleic acid, linoleic acid, behenic acid, hexatriacontanoic acid, tetrapropylenyl-substituted glutaric acid, polybutenyl (Mn=200–1,500, preferably 300–1,000)-substituted succinic acid, polypropylenyl, (Mn=200–1,000, preferably 300–900)-substituted succinic acid, octadecyl-substituted adipic acid, 9-methylstearic acid, stearyl-benzoic acid, eicosane-substituted naphthoic acid, dilauryl-decahydronaphthalene carboxylic acid, mixtures of these acids, and/or their anhydrides. Aliphatic fatty acids include the saturated and unsaturated higher fatty acids containing from about 12 to about 30 carbon atoms. Illustrative of these acids are lauric acid, palmitic acid, oleic acid, linoleic acid, linolenic acid, oleostearic acid, stearic acid, myristic acid, and undecalinic acid, alpha-chlorostearic acid, and alphanitrolauric acid. Branched fatty acids, both saturated and unsaturated, in the range from about 6 to about 25 carbon atoms are included. Such branched fatty acids include versatic acids, available from Shell Chemicals. For example, Shell Chemical produces a versatic acid known as Monomer Acid, which is the distilled product obtained during the manufacture of tall oil-based dimer acid. Monomer Acid is a mixture of both branched and straight-chain predominantly $C_{18}$ mono fatty acids. One example is Versatic 10, a synthetic saturated monocarboxylic acid of highly branched structure containing ten carbon atoms. Its structure may be represented as:

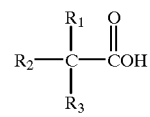

where R1, R2 and R3 are alkyl groups at least one of which is always methyl.

The sulfonic acids useful in making the guanidine wetting agents include the sulfonic and thiosulfonic acids. Generally they are salts of sulfonic acids. The sulfonic acids include the mono- or polynuclear aromatic or cycloaliphatic compounds. The oil-soluble sulfonates can be represented for the most part by one of the following formulae: $R^7$—T—$(SO_3)_d$ and $R^8$—$(SO_3)_e$, wherein T is a cyclic nucleus such as, for example, benzene, naphthalene, anthracene, diphenylene oxide, diphenylene sulfide, petroleum naphthenes, etc.; $R^7$ is an aliphatic group such as alkyl, alkenyl, alkoxy, alkoxyalkyl, etc.; ($R^7$)+T contains a total of at least about 15 carbon atoms; $R^8$ is an aliphatic hydrocarbyl group containing at least about 15 carbon atoms and d and e are each independently an integer from 1 to about 3, preferably 1. Examples of $R^8$ are alkyl, alkenyl, alkoxyalkyl, carboalkoxyalkyl, etc. Specific examples of $R^8$ are groups derived from petrolatum, saturated and unsaturated paraffin wax, and the above-described polyalkenes. The groups T, $R^7$, and $R^8$ in the above formulae can also contain other inorganic or organic substituents in addition to those enumerated above such as, for example, hydroxy, mercapto, halogen, nitro, amino, nitroso, sulfide, disulfide, etc. In the above Formulae, d and e are at least 1.

Illustrative examples of these sulfonic acids include monoeicosane-substituted naphthalene sulfonic acids, dodecylbenzene sulfonic acids, didodecylbenzene sulfonic acids, dinonylbenzene sulfonic acids, cetylchlorobenzene sulfonic acids, dilauryl beta-naphthalene sulfonic acids, the sulfonic acid derived by the treatment of polybutenyl, having a number average molecular weight (Mn) in the range of about 500, preferably about 800 to about 5000, preferably about 2000, more preferably about 1500, with chlorosulfonic acid, nitronaphthalene sulfonic acid, paraffin wax sulfonic acid, cetyl-cyclopentane, sulfonic acid, lauryl-cyclohexane sulfonic acids, polyethylenyl (Mn=300–1,000, preferably 750) sulfonic acids, etc. Normally the aliphatic groups will be alkyl and/or alkenyl groups such that the total number of aliphatic carbons is at least about 8, preferably at least 12.

A preferred group of sulfonic acids are mono-, di-, and tri-alkylated benzene and naphthalene (including hydrogenated forms thereof) sulfonic acids. Illustrative of synthetically produced alkylated benzene and naphthalene sulfonic acids are those containing alkyl substituents having from about 8 to about 30 carbon atoms, preferably about 12 to about 30 carbon atoms, and advantageously about 24 carbon atoms. Such acids include di-isododecyl-benzene sulfonic acid, polybutenyl-substituted sulfonic acid, polypropylenyl-substituted sulfonic acids of Mn=300–1000, preferably 500–700, cetylchlorobenzene sulfonic acid, di-cetyinaphthalene sulfonic acid, di-lauryidiphenylether sulfonic acid, diisononylbenzene sulfonic acid, di-isooctadecylbenzene sulfonic acid, stearyinaphthalene sulfonic acid, and the like.

The production of sulfonates from detergent manufactured by-products by reaction with, e.g., $SO_3$, is well known to those skilled in the art. See, for example, the article "Sulfonates" in Kirk-Othmer "Encyclopedia of Chemical Technology", Second Edition, Vol. 19, pp. 291 et seq. published by John Wiley & Sons, New York (1969).

The phosphorus-containing acids useful in making the guanidine wetting agents include any phosphorus acids such as phosphoric acid or esters; and thiophosphorus acids or esters, including mono and dithiophosphorus acids or esters. Preferably, the phosphorus acids or esters contain at least one, preferably two, hydrocarbyl groups containing from 1 to about 50 carbon atoms, typically 1, preferably 3, more preferably about 4 to about 30, preferably to about 18, more preferably to about 8.

In one embodiment, the phosphorus-containing acids are dithiophosphoric acids which are readily obtainable by the reaction of phosphorus pentasulfide ($P_2S_5$) and an alcohol or a phenol. The reaction involves mixing at a temperature of about 20° C. to about 200° C. four moles of alcohol or a phenol with one mole of phosphorus pentasulfide. Hydrogen sulfide is liberated in this reaction. The oxygen-containing analogs of these acids are conveniently prepared by treating the dithioic acid with water or steam which, in effect, replaces one or both of the sulfur atoms with oxygen.

In one embodiment, the phosphorus-containing acid is the reaction product of the above polyalkenes and phosphorus sulfide. Useful phosphorus sulfide-containing sources include phosphorus pentasulfide, phosphorus sesquisulfide, phosphorus heptasulfide and the like.

The reaction of the polyalkene and the phosphorus sulfide generally may occur by simply mixing the two at a temperature above 80° C., preferably between 100° C. and 300° C. Generally, the products have a phosphorus content from about 0.05% to about 10%, preferably from about 0.1% to about 5%. The relative proportions of the phosphorus sulfide to the olefin polymer is generally from 0.1 part to 50 parts of the phosphorus sulfide per 100 parts of the olefin polymer.

The phenols useful in making the guanidine wetting agents may be represented by the formula (R)f —Ar—(OH)g, wherein R and Ar are defined above; f and g are independently numbers of at least one, the sum of f and g being in the range of two up to the number of displaceable hydrogens on the aromatic nucleus or nuclei of Ar. Preferably, f and g are independently numbers in the range of 1 to about 4, more preferably 1 to about 2. R and f are preferably such that there is an average of at least about 8 aliphatic carbon atoms provided by the R groups for each phenol compound. Examples of phenols include octylphenol, nonylphenol, propylene tetramer substituted phenol, tri(butene)-substituted phenol, polybutenyl-substituted phenol and polypropenyl-substituted phenol.

OTHER ADDITIVES

Other additives used in prior art binder compositions are not necessary with the binder composition of the present invention. In one embodiment, no additives beyond the inventive binder composition are used. In one embodiment, as deemed necessary, small amounts of other materials may be added to the composition of the present invention. For example, plasticizers may be added to the compositions to provide more workable compositions. Examples of plasticizers normally utilized in inorganic formulations include dioctyl phthalate, dibutyl phthalate, benzyl butyl phthalate and phosphate esters.

METHODS

The present invention further relates to a method for forming a part by powder injection molding, comprising the steps of (a) forming a green composition comprising a binder composition and an inorganic powder, wherein the binder composition comprises a polycarbonate polymer, an ethylenebisamide wax, and a guanidine wetting agent, (b) transferring the green composition into a mold for a part, (c) heating the part to a temperature at which the binder composition decomposes, (d) heating the part to a temperature at which the powder is sintered to form the part, and (e) cooling and removing the part from the mold. In one embodiment, the transferring step (b) includes heating and injection of the green composition into a mold for powder injection molding. In one embodiment, the transferring step (b) includes gravity feeding the green composition into a mold for press & sinter molding. In one embodiment of the method, the heating step (d) is performed as a series of temperature increases to selected temperatures, in which the selected temperatures correspond to debinding temperatures of the components in the binder composition. In one embodiment, the selected temperatures are held for a period of time, to allow the component to be debound prior to increasing the temperature to a debinding temperature of another component. In one embodiment of the method, the order of debinding is polycarbonate polymer first, ethylenebisamide second, and guanidine wetting agent last. In one embodiment, a wicking agent may be used in the debinding step. In one embodiment, the wicking agent may be used in both the debinding step and the sintering step. The wicking agent may be, for example, a fine alumina or zirconia sand.

In one embodiment of the method, the inorganic powder is selected from a metal powder, a metal oxide powder, a non-metallic powder and a ceramic powder. In one embodiment of the method, the guanidine wetting agent is a reaction product of guanidine and an acid selected from organic acid, a fatty acid and a stronger acid such as an alkyl sulfonic acid. In one embodiment of the method, the guanidine wetting agent is guanidine stearate. In one embodiment of the method, the guanidine wetting agent is guanidine ethylhexanoate. In one embodiment of the method, the guanidine wetting agent is guanidine lauryl sulfonate.

In one embodiment of the method, the polycarbonate polymer has a number average molecular weight in the range from about 25,000 to about 50,000. In one embodiment of the method, the polycarbonate polymer has a number average molecular weight in the range from about 30,000 to about 45,000. In one embodiment of the method, the polycarbonate polymer has a number average molecular weight in the range from about 35,000 to about 40,000.

In one embodiment of the method, the ethylenebisamide wax has a discrete melting point in the range from about 120° C. to about 160° C. In one embodiment of the method, the ethylenebisamide wax has a discrete melting point in the range from about 130° C. to about 150° C. In one embodiment of the method, the ethylenebisamide wax has a discrete melting point of about 140° C. In one embodiment of the method, the ethylenebisamide is ACRAWAX C® brand of ethylenbisstearamide and has a discrete melting point of about 142° C.

In one embodiment of the method, the binder composition comprises the guanidine wetting agent in the range from about 5 wt % to about 30 wt % based on the binder composition, the polycarbonate polymer in the range from about 30 wt % to about 85 wt % based on the binder composition, and the ethylenebisamide wax in the range from about 10 wt % to about 40 wt % based on the binder composition. In one embodiment of the method, the binder composition comprises the guanidine wetting agent at about 15.5 wt %, the polycarbonate polymer at about 59.4 wt %, and ethylenebisstearamide at about 25.1 wt %, each weight percent based on the binder composition. In one embodiment of the method, the polycarbonate polymer is Q-PAC™ 40 brand of poly(propylene carbonate), and is present at about 60 wt %. In one embodiment of the method, the ethylenebisamide is AGRAWAX® brand of ethylenebisstearamide, and is present at about 25 wt %.

In one embodiment of the method, the binder composition comprises the guanidine wetting agent in the range from about 10 wt % to about 25 wt % based on the binder composition, the polycarbonate polymer in the range from about 40 wt % to about 60 wt % based on the binder composition, and the ethylenebisamide wax in the range from about 15 wt % to about 35 wt % based on the binder composition.

In one embodiment of the method, the binder composition is present in an amount in the range from about 30 vol % to about 60 vol % of the green composition and the inorganic powder is present in an amount from about 70 vol % to about 40 vol % of the green composition. In one embodiment of the method, the binder composition is present in an amount in the range from about 40 vol % to about 50 vol % of the green composition and the inorganic powder is present in an amount from about 60 vol % to about 40 vol % of the green composition. In one embodiment, the green composition includes the binder composition in an amount of about 35 vol % and the inorganic powder in an amount of about 65 vol %.

PREPARATION

FIG. 1 is a schematic diagram of the steps in a method of making a part by powder injection molding in accordance with the present invention. FIG. 1 shows a generalized process for powder injection molding which may be performed in accordance with the present invention. In a first step 10 an inorganic powder and a binder composition according to the present invention are obtained and combined. In one embodiment, the step of preparing the binder composition includes steps of mixing, blending and dispersing the components of the binder composition as needed to prepare a homogenous, or nearly homogenous mixture of the components in the binder composition, in a powder form. In one embodiment, the binder composition and the inorganic powder are first dry blended to produce a homogenous mix of dry materials. In one embodiment, the binder composition is micronized to a size similar to that of the inorganic powder with which it will be combined to form the green composition. In one embodiment, the binder composition is ground to a particle size in the range from about 10 $\mu$m to about 100 $\mu$m.

In an optional second step (not shown) the inorganic powder and the binder composition are combined in a premixing of the green composition. The optional premixing step may include mixing in, e.g., a ball mill. In this optional step, additional components, if used, may be added and blended into the mixture as desired.

In a step 20 the components of the green composition are fed into a twin screw compounding extruder. In the step 20, while passing through the twin screw compounding extruder, the components of the green composition are subjected to a high shear for effectively combining the inorganic powder and binder composition. In one embodiment, the output from the twin screw compounding extruder is a string of the green composition, which is then fed to a pelletizer. In one embodiment, the output from the twin screw compounding extruder is pelletized by a pelletizing apparatus directly attached to the extruder apparatus. Forming the green composition into pellets facilitates handling, both for immediate and for subsequent use. The mixing in the twin screw compounding extruder in the step 20 facilitates blending the various green compositions as may be required for particular applications. The mixing in the twin screw compounding extruder in the step 20 combines, compounds and pelletizes the green composition. The pellets formed by the step 20 are cooled, and may be stored for later use.

Figure 5:
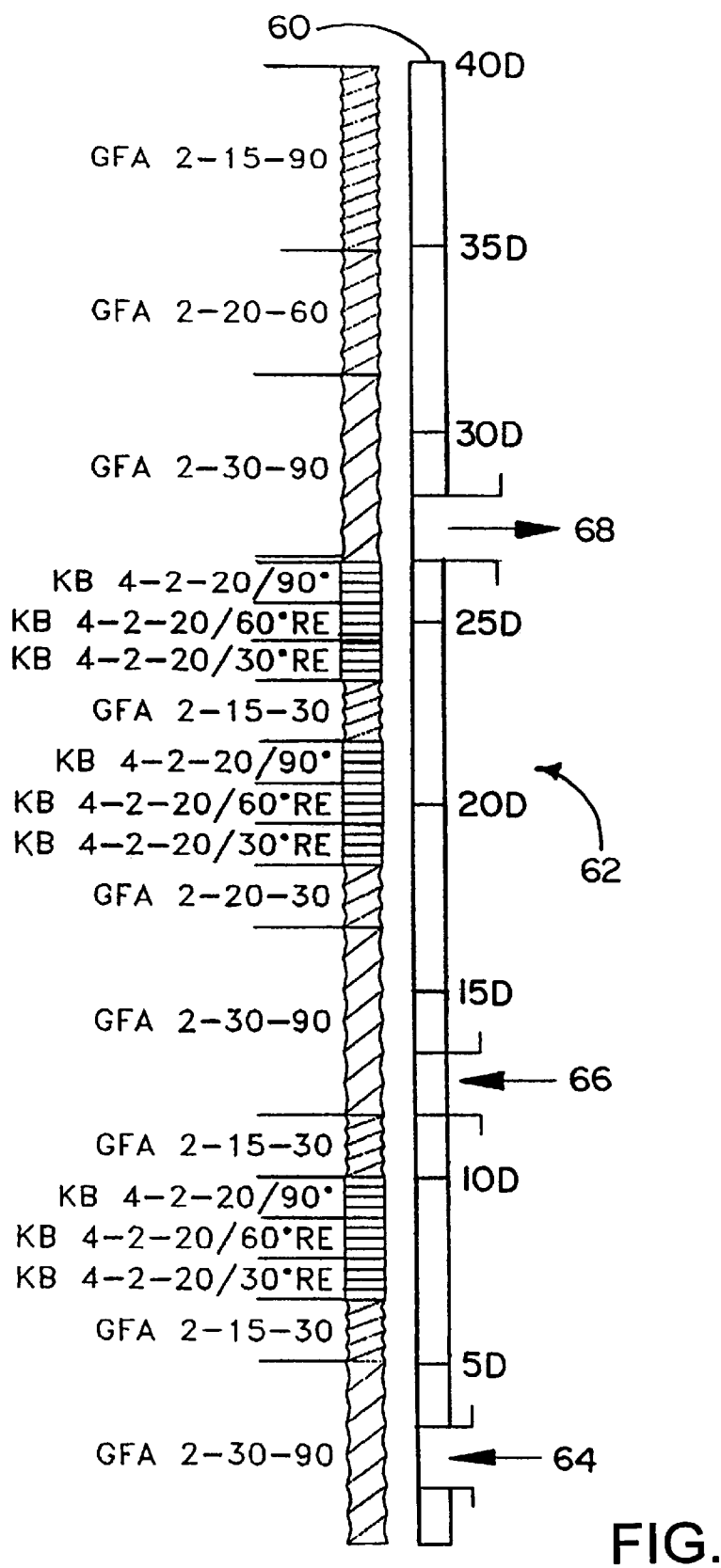
FIG. 5 is a schematic engineering drawing of one screw of a twin screw compounding extruder in accordance with one embodiment of the invention.

In one embodiment of the step 20 the binder composition is dry blended with the inorganic powder prior to feeding to the twin screw compounding extruder, and the blended components of the green composition are fed into the extruder together. In one embodiment, the binder composition and inorganic powder components of the green composition are fed separately into the twin screw compounding extruder. In one embodiment, the binder composition is fed into the twin screw compounding extruder at a first point, and the inorganic powder component is fed in at a second point, downstream from the first point. In one embodiment, the twin screw compounding extruder is a Leistritz 18 mm co-rotating twin screw compounding extruder. In one embodiment, the Leistritz twin screw extruder has the design shown in FIG. 5. A further description of FIG. 5 is provided below. In one embodiment, the green composition exiting the twin screw compounding extruder emerges in the form of a string, passing onto a conveyor, which is subsequently cooled and then cut into pellets.

Referring still to FIG. 1, in an injection molding step 30, the pellets of the green composition are heated, melted, mixed and injected into a mold having the desired shape of the part of interest. The part formed at this stage is known as a green part or a compact for a part. In one embodiment, the molten green composition is injected into the mold at a pressure in the range from about 100 psi (about 70,307 Kg/m$^2$) to about 2000 psi (about 1,406,139 Kg/m$^2$). In one embodiment, the molten green composition is injected into the mold at a pressure of about 800 psi (about 562,455 Kg/m$^2$). In the injection step 30, pellets having different green compositions may be blended. Following the injection step 30, the green part is cooled and released from the mold.

In one embodiment, the pellets are fed into a hopper and thence into a horizontal injection molding machine. In one embodiment, the Injection molding machine is a standard injection molding machine used for injection molding parts in known processes.

In one embodiment, the green part has a green strength in the range of about 800 psi (about 562,456 Kg/m$^2$) to about 12,000 psi (about 8,436,835 Kg/m$^2$). In one embodiment, the green part has a green strength in the range of about 2000 psi (about 1,406,139 Kg/m$^2$) to about 8000 psi (about 5,624,556 Kg/m$^2$). In one embodiment, the green part has a green strength in the range of about 4000 psi (about 2,812,278 Kg/m$^2$) to about 6000 psi (about 4,218,418 Kg/m$^2$).

The green part is then transferred to a debinding/sintering oven, in which one or more steps of debinding 40 are carried out. In one embodiment, the debinding step 40 includes a plurality of temperature increases to elevated temperatures. In one embodiment of the debinding step 40, each of the elevated temperatures are maintained constant for a period of time. In one embodiment of the debinding step 40, the elevated temperatures correspond to temperatures at which individual ingredients of the binder composition are debound. In one embodiment of the debinding step 40, a first elevated temperature corresponds to the debinding temperature of the polycarbonate polymer, a second elevated temperature corresponds to the debinding temperature of the ethylenebisamide wax, and a third elevated temperature corresponds to the debinding temperature of the guanidine wetting agent. In one embodiment of the debinding step 40, the third elevated temperature is higher than the second elevated temperature, and the second elevated temperature is higher than the first elevated temperature.

Following the debinding step 40, the green part is subjected to a step 50 of sintering. The sintering step 50 may be performed in the same oven in which the debinding step 40 was performed, or the green part may be moved to a separate sintering oven for the sintering step 50.

The variables for the debinding process conditions include selection of the identity, pressure and flow rate of the atmosphere in the debinding oven chamber, selection of the temperatures for each debinding step, selection of the rate of increase in temperature during the transition from one debinding step to the next, and selection of the time each debinding temperature is held while a particular component is debound from the green composition. Additional variables arise from the exact nature of both the components of the binder composition and the inorganic powder used in the green composition. The time period at which a particular debinding temperature is held during a debinding process is known as "soaking" the green composition at that temperature. The time periods for soaking, and the rate of increase between those temperatures must be selected for a given binder composition and a given green composition. A certain amount of trial and error is required to optimize the debinding conditions for a given binder composition and green composition. The following general principles may be applied to make an initial selection of debinding conditions, but the number of variables make it likely that some testing will be required.

In selecting the environment for the debinding and sintering, the temperatures selected for each step of the debinding are primarily influenced by the melting and decomposition temperature of each component of the binder composition and by the atmosphere in the debinding oven chamber. However, other factors may be involved as well.

Generally, the temperature at which a part is soaked for removal of each component during the debinding corresponds to the onset temperature of its decomposition. In a debinding process, it is helpful if a component melts before decomposing, but the important step is the decomposition. If the component melts prior to decomposing, as has been described herein for the poly(propylene carbonate) polymer, it is helpful to the overall debinding process due to the relatively small expansion of volume in melting as compared to decomposing into gaseous products. Thus, for example, a component may have a certain melting point, such as ethylenebisstearamide has a melting point of 142° C., but its debinding via decomposition is carried out at temperatures in the range from about 190° C. to about 225° C., depending on the atmosphere in the debinding oven chamber.

The atmosphere in the debinding over chamber determines the speed of debinding at a given temperature. Generally, at a given temperature, an atmosphere of hydrogen results in faster debinding than a vacuum (e.g., 4–12 hours for hydrogen vs. 6–18 hours for vacuum), and a vacuum results in faster debinding than an inert atmosphere, for example of argon or nitrogen (e.g., 6–18 hours for vacuum vs. 8–24 hours for an inert gas atmosphere). Alternatively, for a given time for a debinding step, using an atmosphere of hydrogen allows the debinding step to be carried out at a lower temperature than the same debinding step carried out in a vacuum, and a vacuum allows the same debinding step to be carried out at a lower temperature than it would in an inert gas atmosphere. Thus, for example, a polycarbonate debinding step which may be carried out by soaking for 60 minutes at 160° C. in a hydrogen atmosphere, would need to be carried out by soaking for 60 minutes at about 190° C. in a nitrogen atmosphere. Alternatively, a polycarbonate debinding step which may require soaking for 60 minutes at 160° C. in a hydrogen atmosphere, may require soaking for about 90 minutes at 160° C. in a nitrogen atmosphere. The examples provided below provide an indication of the temperatures and times which may be required for debinding the binder compositions of the present invention. Suitable atmospheres include, e.g., air, nitrogen, hydrogen, oxygen, argon, and other inert gases.

The pressure and flow rate of the gases used in the debinding oven chamber provide another variable which must be considered in designing a debinding profile. In a hydrogen atmosphere, the pressure is typically from about 10% to about 20% above atmospheric, and the hydrogen Is passed through a $2^3$ ft chamber at the rate of about 10 $ft^3$/hr (CFH) to about 15 CFH, or in one embodiment in the same chamber at the rate of about 12 CFH. When at atmosphere other than air is used, it is normally provided at a super-atmospheric pressure in order to avoid leakage ingress of air into the debinding oven chamber. In one embodiment, the pressure in the debinding oven chamber is about 780 torr. Sub-atmospheric pressures may also be used. In one embodiment, a vacuum is placed upon the oven chamber, by reducing the pressure to about 76 torr. In other embodiments, similar reduced pressures may be used. Suitable pressures range from a vacuum, i.e. about $10^{-5}$ to about $10^{-7}$ torr, to at least about 2 atmospheres, i.e., about 1540 torr. Suitable flow rates range from a flow rate sufficient to produce from about 1 atmospheric exchange per hour to a flow rate sufficient to produce at least about 20 atmospheric exchanges per hour, determined by the volume of the chamber and the flow rate of gas.

Further variables of properties of the inorganic powder which affect time and temperature for the debinding steps for a particular green composition are: particle size, particle morphology, percent porosity and continuity of porosity. The effects of these variable are complex, and some testing may be required to obtain the optimum for each of these properties for a given inorganic powder and binder composition combination used in a green composition. For example, decreased particle size increases the surface area which in turn increases the sinterability to produce fully dense parts. When particles are more closely packed, less porosity is formed and the likelihood of pore continuity decreases. This means the binder composition will be retarded in finding a means of escape from the part as the debinding process proceeds. Thus, the result of smaller inorganic powder particle size is likely to be a longer debind time, since the temperature increases may be required to proceed at a reduced rate of increase.

A further variable which affects time and temperature for the debinding steps for a particular green composition is the chemical nature of the inorganic powder. A powder may tend to act as an activator, or even like a catalyst, in the decomposition of one or more of the components of a binder composition, and so may result in faster debinding of those components. Alternatively, if the inorganic powder is a relatively inert material, such as alumina, $Al_2O_3$, the primary factors affecting the debinding process are the temperature, time and atmosphere of the debinding.

Alternatives to the preparation of green parts as described above by PIM include pressing the green composition into a mold for P&S, followed by a sintering step. Alternatively, the blended green composition can be extrusion- or ejection-molded to form a green body, or the green body can be prepared by casting the mixture on a tape. The green body may also be prepared by spray-drying rotary evaporation, etc. Following the formation of the blended green composition into the desired shape, the shaped mass is subjected to the above described elevated temperature treatments. These treatments first eliminate the binder composition, as described more fully above, and then sinter the inorganic powders resulting in the formation of a shape having the desired properties including suitable densities.

For metal powders, the sintering generally occurs between about 400° C. to about 2100° C., typically to about 1000° C. For ceramic processes, the sintering generally occurs from about 600° C., preferably about 700° C. up to about 1700° C. Of course, the sintering temperature is characteristic of the particular inorganic powder used in the green composition, and may be affected by impurities or additives. For example, carbonyl iron is frequently doped with nickel, at the level of, for example, about 2 wt %, as a sintering aid. The presence of the nickel allows the sintering to take place at a lower temperature and/or in a shorter amount of time than would otherwise be required for carbonyl iron. When the inorganic powders are oxide powders, baking and sintering can be effected in the presence of oxygen. When the inorganic powders are non-oxide powders such as the nitrides and carbides, sintering is effected in a nonoxidizing atmosphere such as an atmosphere of hydrogen, argon or nitrogen gas.

The debinding step takes place at moderately elevated temperatures, and is generally completed by ramping to a series of temperatures below about 700° C. It is the debinding steps which are the primary focus of the present invention.

Removal of the organic materials of the binder composition is generally completed before the inorganic powders are subjected to sintering. In this process, substantially all of the binder composition is removed. Some of the binder composition materials may remain following the debinding, although the amount is relatively small. These remaining portions of the binder composition will be essentially completely removed in the sintering steps, depending of course, on factors such as the decomposition temperature of the remaining binder component, the sintering temperature and the sintering atmosphere.

Each of the three ingredients of the binder composition, the polycarbonate polymer, the ethylenebisamide and the guanidine wetting agent, may be initially formed in a solid, pelletized form. To form the pellets, these ingredients are combined and heated to melting, at approximately 100° C., in the manner indicated above. The three ingredients are-partially miscible with each other, so that when actively mixed in a twin screw compounding extruder at approximately 100° C., the binder composition is almost homogenous, and the binder composition quickly and easily forms a uniform heterogeneous mixture with a minimum of shear. Thus, the binder composition forms a uniform heterogeneous mixture with only one extrusion cycle. In one specific case, the liquid binder composition was mixed at a temperature of approximately 100° C. to form a uniform heterogeneous mixture within 10 minutes of extrusion.

The heated heterogeneous liquid mixture of the binder composition may be mixed with the inorganic powder to form the green composition. The mixing of the binder composition and inorganic powder to form the green composition is best undertaken in the twin screw compounding extruder, which, among other benefits, results in thorough mixing with a minimum of exposure of the green composition components to atmospheric air. Such exposure may be deleterious to either or both the binder composition and the inorganic powder.

The green composition, when mixed at a temperature of about 100° C. form a liquid with a viscosity of between 5 and 300 Pascal-seconds depending on the shear rate. As the shear rate increases, the viscosity generally decreases to some degree, although as would be understood, there is a limit to the decrease.

The heated green composition may be extruded at approximately 100° C. to form feedstock pellets. The feedstock pellets, once made, may be injection molded at any subsequent time by heating to a temperature of approximately 100° C. and pumping into a mold to make a green part, which is also known as a compact of a part. The resulting green part was then subjected to the series of temperature increases to debind the compact and thence to sinter the inorganic powder, as has been described above.

In one embodiment, the method includes, in step (d), a plurality of temperature increases to elevated temperatures. In one embodiment, the method includes maintaining each of the elevated temperatures constant for a period of time. In one embodiment of the method, the elevated temperatures correspond to temperatures at which individual ingredients of the binder composition are debound. In one embodiment, the elevated temperatures include a first elevated temperature which corresponds to the debinding temperature of the polycarbonate polymer, a second elevated temperature which corresponds to the debinding temperature of the ethylenebisamide wax, and a third elevated temperature which corresponds to the debinding temperature of the guanidine wetting agent. In one embodiment, the third elevated temperature is higher than the second elevated temperature, and the second elevated temperature is higher than the first elevated temperature.

Debinding of the compact may be completed when the temperature of the compact reaches about 600° C. The temperature should be maintained at this level for a period of up to about 12 hours. This heating process removed the binder composition from the compact. The compact was then sintered by heating the compact to a temperature of approximately 1,650° C. for a period of up to 4 hours. The resulting product is a part made of the inorganic material of which the inorganic powder had been made.

FIG. 5 is a schematic engineering drawing of one screw 60 of a twin screw compounding extruder 62 in accordance with one embodiment of the invention. The twin screw compounding extruder 62 shown in FIG. 5 is a schematic depiction of a Leistritz 18 mm twin screw compounding extruder, which is used in one embodiment of the method of the present invention. The Leistritz twin screw compounding extruder 62 provides a high level of combining and compounding the components of the green composition of the present invention. As shown in FIG. 5, the screw 60 is used in the twin screw extruder 62. The twin screw extruder 62 includes a main feed 64, a secondary feed 66 and a vent 68. In one embodiment, the binder composition is fed into the main feed 64 and the inorganic powder is fed into the secondary feed 66. The vent 68 is provided to vent entrapped gases and to maintain the internal pressure in the twin screw compounding extruder 62 at a desired level.

EXAMPLES

The following exemplary formulations are intended to provide a better understanding of the invention, and are not intended as limiting.

Example 1

A green composition comprising a binder composition and carbonyl iron, according to the present invention, was prepared as follows.

The binder composition was as follows:

| | |
|---|---|
| poly(propylene carbonate) Q-PAC ™ 40 | 59.43 wt % |
| ethylenebisstearamide ACRAWAX ® C | 25.15 wt % |
| guanidine ethyl hexanoate | 8.49 wt % |
| guanidine stearate | 6.94 wt % |
| Total | 100.0 |

The binder composition was prepared by combining the ingredients in a twin screw compounding extruder, heating to about 100° C. for about 10 minutes, until the mixture is substantially homogenous, and then pelletizing the binder composition in, e.g., a strand cutter pelletizing apparatus. This binder composition is designated APEX™ 201.

The ingredients for the green composition, comprising 59 vol % carbonyl iron doped with 2 wt % nickel powder as a sintering aid, and 41 vol % of pellets of the above binder composition were combined, compounded and pelletized in a twin screw compounding extruder as described above. Expressed on a weight basis, the green composition comprised 91 wt % carbonyl iron/Ni and 9 wt % of the above binder composition. After the green composition was thoroughly compounded, it was extruded and pelletized. The pellets were subsequently fed into an injection molding machine, and injected into a mold.

Example 2

A green composition comprising a binder composition and titanium CP powder, according to the present invention, was prepared as follows.

The binder composition was the same as in Example 1.

The ingredients for the green composition, comprising 59 vol % titanium CP grade powder, and 41 vol % of the binder composition prepared in Example 1, were combined and compounded and pelletized in a twin screw compounding extruder as described above. Expressed on a weight basis, the green composition comprised 83 wt % titanium OP grade powder and 17 wt % of the above binder composition. After the green composition was thoroughly compounded, it was extruded and pelletized. The pellets were subsequently fed into an injection molding machine, and injected into a mold.

Example 3

A green composition comprising a binder composition and sub-micron zirconia powder stabilized with yttria, according to the present invention, was prepared as follows.

The binder composition was the same as in Example 1.

The ingredients for the green composition, comprising 47 vol % zirconia powder stabilized with yttria powder, and 53 vol % of pellets of the binder composition prepared in Example 1, were combined, compounded and pelletized in a twin screw compounding extruder as described above. Expressed on a weight basis, the green composition comprised 80 wt % zirconia/$Y_2O_3$ powder and 20 wt % of the above binder composition. After the green composition was thoroughly compounded, it was extruded and pelletized. The pellets were subsequently fed into an injection molding machine, and injected into a mold.

Figure 2:
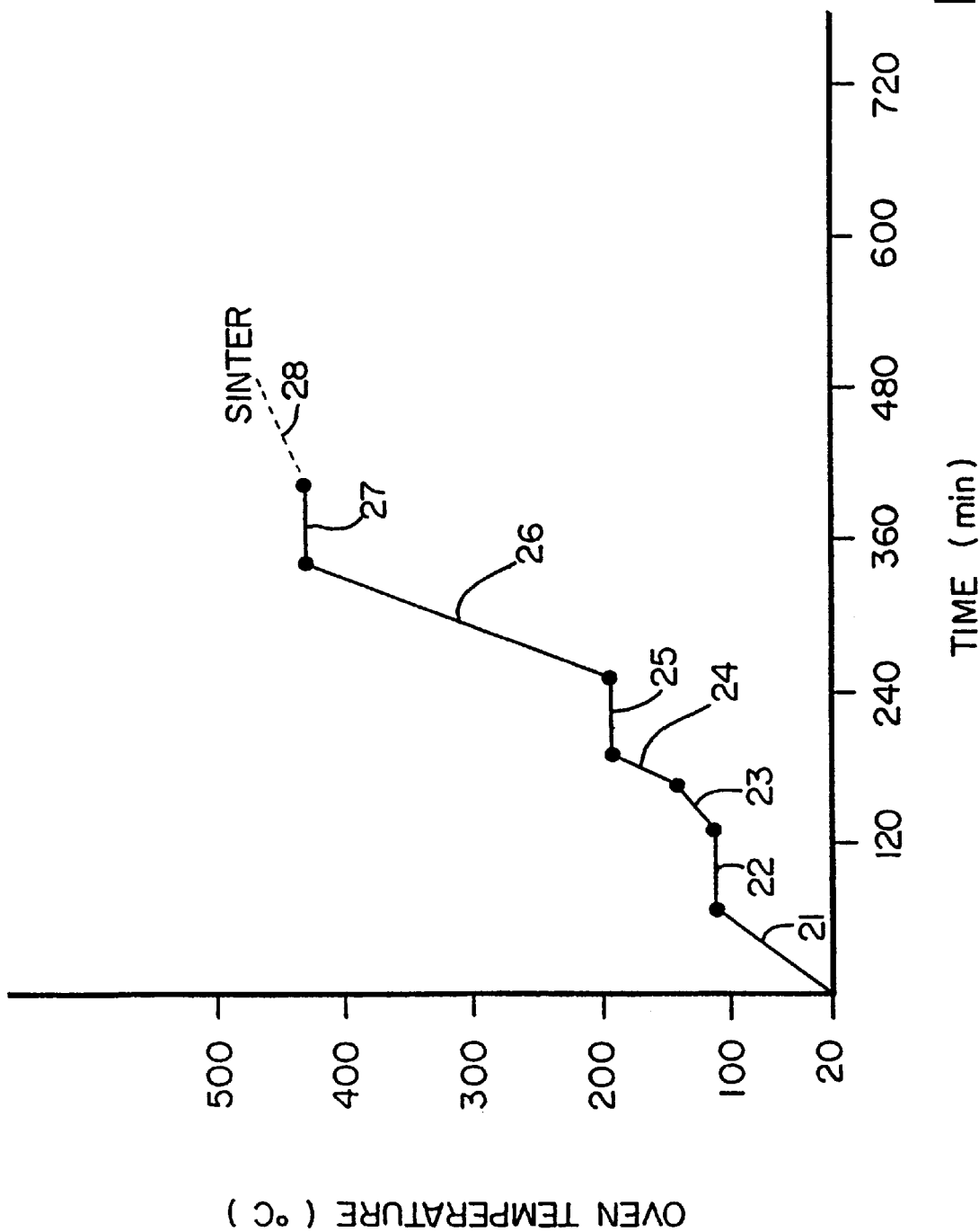
FIG. 2 is a graph of a debinding profile of a first exemplary green composition according to the present invention.

FIG. 2 is a graph of a debinding profile of a first exemplary green composition according to the present invention. The debinding profile shown in FIG. 2 reflects the following steps of a debinding process:

| Step No. | Action in Step | Time, min. | Elapsed Time, min. |
|---|---|---|---|
| 21 | Heat from RT @ 75° C./hr to 110° C. | 68 | 68 |
| 22 | Soak (hold) @ 110° C. | 60 | 128 |
| 23 | Heat from 110° C. @ 100° C./hr to 140° C. | 18 | 146 |
| 24 | Heat from 140° C. @ 75° C./hr to 190° C. | 40 | 186 |
| 25 | Soak (hold) @ 190° C. | 60 | 246 |
| 26 | Heat from 190° C. @ 150° C./hr to 425° C. | 94 | 340 |
| 27 | Soak (hold) @ 425° C. | 60 | 400 |
| 28 | Heat from 425° C. to sintering temperature | | |

The following binder composition was used in the green composition which was subjected to the debinding process shown in FIG. 2:

| | |
|---|---|
| poly(propylene carbonate) Q-PAC ™ 40 | 59.43 wt % |
| ethylenebisstearamide ACRAWAX ® C | 25.15 wt % |
| guanidine ethyl hexanoate | 8.49 wt % |
| guanidine stearate | 6.94 wt % |
| Total | 100.0 |

In FIG. 2, the poly(propylene carbonate) was debound in steps 21 and 22. The ethylenebisstearamide was debound in steps 23, 24 and 25. The guanidine wetting agent was debound in steps 26 and 27. Following substantially complete debinding, and the end of step 27, at an elapsed debinding time of 400 minutes, the part was sintered by heating in step 28 at the rate of 300° C./hr to a sintering temperature of 1425° C. In the steps 21 to 26, the atmosphere was hydrogen at a pressure of 780 torr. In the steps 27 and 28, the chamber was held under a vacuum of about $10^{-6}$ torr.

Figure 3:
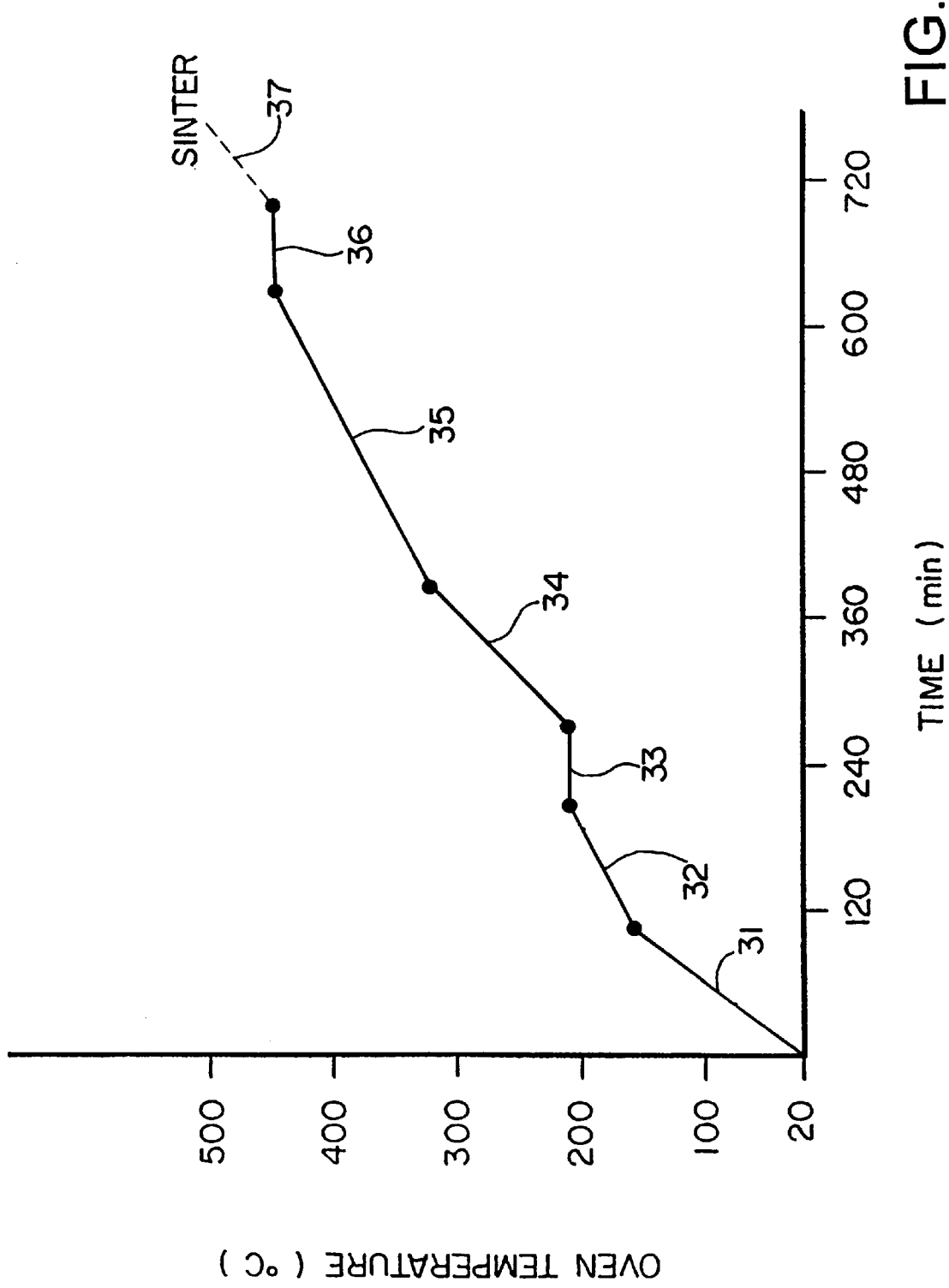
FIG. 3 is a graph of a debinding profile of a second exemplary green composition according to the present invention.

FIG. 3 is a graph of a debinding profile of a second exemplary green composition according to the present invention. The debinding profile shown in FIG. 3 reflects the following steps of a debinding process:

| Step No. | Action in Step | Time, min. | Elapsed Time, min. |
|---|---|---|---|
| 31 | Heat from RT @ 75° C./hr to 160° C. | 108 | 108 |
| 32 | Heat from 160° C. @ 30° C./hr to 210° C. | 100 | 208 |
| 33 | Soak (hold) @ 210° C. | 60 | 268 |
| 34 | Heat from 210° C. @ 60° C./hr to 325° C. | 115 | 383 |
| 35 | Heat from 325° C. @ 30° C./hr to 450° C. | 250 | 633 |

-continued

| Step No. | Action in Step | Time, min. | Elapsed Time, min. |
|---|---|---|---|
| 36 | Soak (hold) @ 450° C. | 60 | 693 |
| 37 | Heat from 450° C. to sintering temperature | | |

The following binder composition was used in the green composition which was subjected to the debinding process shown in FIG. 3:

| | |
|---|---|
| poly(propylene carbonate) Q-PAC ™ 40 | 59.43 wt % |
| ethylenebisstearamide ACRAWAX ® C | 25.15 wt % |
| guanidine ethyl hexanoate | 8.49 wt % |
| guanidine stearate | 6.94 wt % |
| Total | 100.0 |

In FIG. 3, the poly(propylene carbonate) and ethylenebisstearamide were debound together in steps 31, 32 and 33. The guanidine wetting agent was debound in steps 34, 35 and 36. Following substantially complete debinding, and the end of step 36, at an elapsed debinding time of 693 minutes, the part was sintered in step 37 by heating at the rate of 300° C./hr to a sintering temperature of 1425° C. The atmosphere was the same as that set forth above with respect to FIG. 2.

Example 4

A green composition comprising a binder composition and carbonyl iron doped with 2 wt % nickel, according to the present invention, was prepared as follows.

The binder composition was the same as in Example 1.

The ingredients for the green composition, comprising 51 vol % carbonyl iron doped with 2 wt % nickel powder, and 49 vol % of the binder composition prepared in Example 1, were combined, compounded and pelletized in a twin screw compounding extruder as described above. Expressed on a weight basis, the green composition comprised 88 wt % carbonyl iron w/ 2 wt % Ni powder and 12 wt % of the above binder composition. After the green composition was thoroughly compounded, it was extruded and pelletized. The pellets were subsequently fed into an injection molding machine, and injected into a mold.

Figure 4:
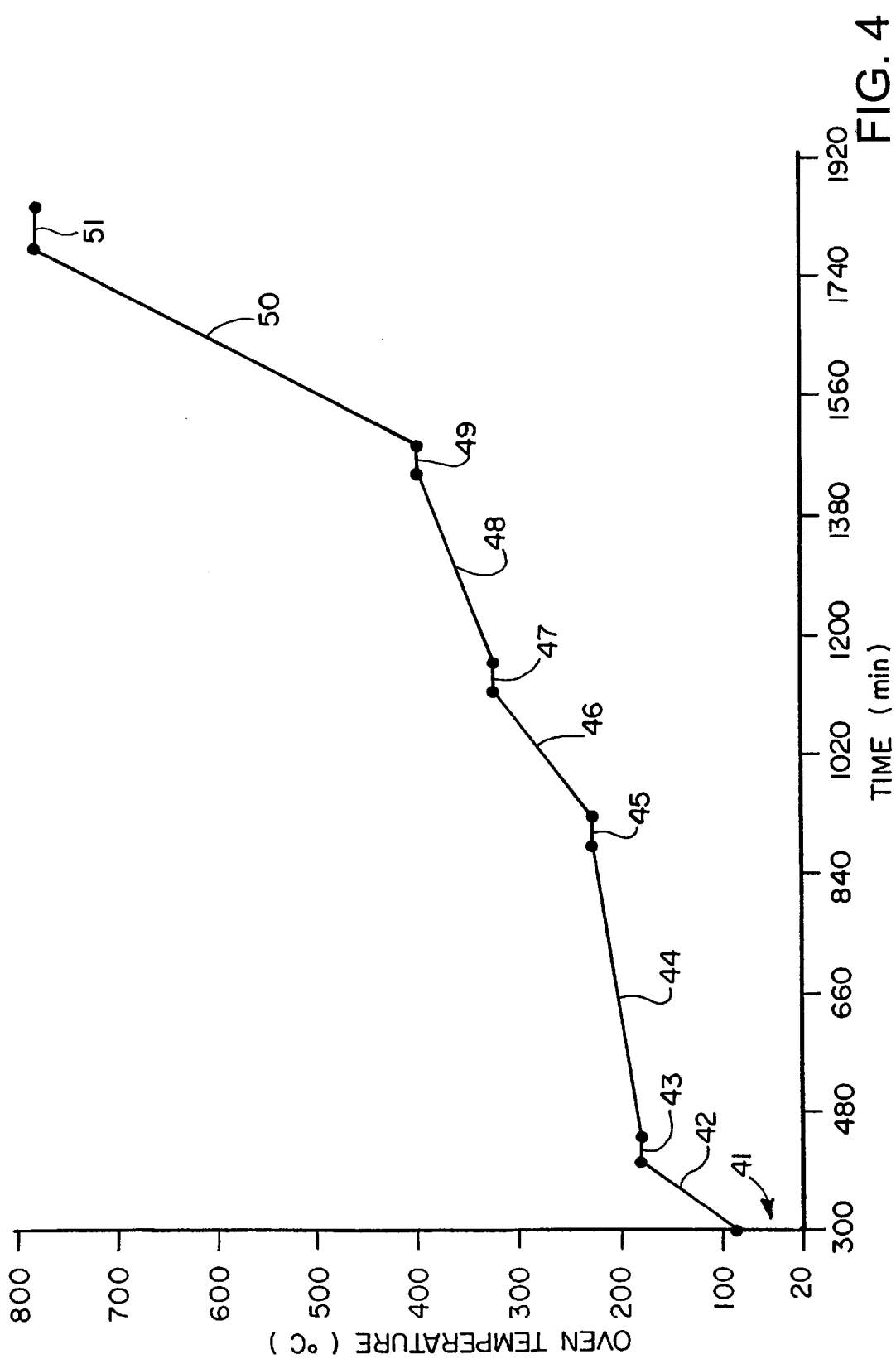
FIG. 4 is a graph of a debinding and partial sintering profile of a third exemplary green composition according to the present invention.

FIG. 4 is a graph of a debinding profile of the green composition of Example 4, according to the present invention. Following a five hour soak at 90° C. to remove surface moisture, which is not shown in FIG. 4, the debinding profile shown in FIG. 4 reflects the following steps of a debinding and sintering process (the sintering steps 52 to 57 are not shown In FIG. 4):

| Step No. | Action in Step | Time, min. | Elapsed Time, min. |
|---|---|---|---|
| 41 | Heat from RT @ 90° C./hold 5 hours | 300 | 300 |
| 42 | Heat from 90° C. @ 48° C./hr to 180° C. | 112 | 412 |
| 43 | Soak (hold) @ 180° C. | 30 | 442 |
| 44 | Heat from 180° C. @ 6° C./hr to 225° C. | 450 | 892 |
| 45 | Soak (hold) @ 225° C. | 30 | 922 |
| 46 | Heat from 225° C. @ 30° C./hr to 325° C. | 200 | 1122 |
| 47 | Soak (hold) @ 325° C. | 30 | 1152 |
| 48 | Heat from 325° C. @ 15° C./hr to 400° C. | 300 | 1452 |
| 49 | Soak (hold) @ 400° C. | 30 | 1482 |
| 50 | Heat from 400° C. @ 78° C./hr to 780° C. | 295 | 1778 |
| 51 | Soak (hold) @ 780° C. | 60 | 1838 |
| 52 | Heat from 780° C. @ 600° C./hr to 800° C. | 2 | 1840 |
| 53 | Soak (hold) @ 800° C. | 10 | 1850 |
| 54 | Heat from 800° C. @ 480° C./hr to 1330° C. | 68 | 1918 |
| 55 | Soak (hold) @ 1330° C. | 5 | 1923 |
| 56 | Heat from 1330° C. @ 60° C./hr to 1380° C. | 50 | 1973 |
| 57 | Soak (hold) @ 1380° C. | 80 | 2053 |

The binder composition shown in Example 1 was used in the green composition which was subjected to the debinding process shown in FIG. 4. In the debinding process shown in FIG. 4, the atmosphere was hydrogen, at a flow rate of 12 CFM and a debinding oven chamber pressure of 780 torr. In the debinding process shown in FIG. 4, the poly(propylene carbonate, was debound in steps 42 and 43, ethylenebisstearamide was debound in steps 44 and 45. The guanidine wetting agent was debound in steps 46 and 47. Steps 48 and 49 provide an extra backup or "insurance" step to make certain that the debinding process is complete. Such "insurance" steps are not always necessary, but may be desirable, particularly during the development of a debinding protocol. Following substantially complete debinding, and the end of step 49, at an elapsed debinding time of 1482 minutes, the part was sintered in steps 50–57, as shown in the foregoing table to a final sintering temperature of 1380° C. Steps 52–57 are not shown in FIG. 4 due to space limitations, however, the profile would continue in accordance with the data shown in the foregoing table in a manner similar to that shown for the debinding steps as shown in the table and FIG. 4. It is noted that the initial step of soaking at 90° C. for five hours can be eliminated with proper materials handling. If the binder composition and the inorganic powder are maintained in a suitably dry condition, a step of drying would not be required.

A wide variety of parts can be made by PIM in accordance with the present invention. Such parts include for example, for an inorganic powder which is a metal, gun parts, shear clipper blades and guides, watch band parts, watch casings, coin feeder slots, router bits, drill bits, disk drive magnets, VCR recording heads, jet engine parts, orthodontic braces and prostheses, dental brackets, orthopedic implants, surgical tools and equipment, camera parts, computer parts, and jewelry. Such parts include for example, for intermetallic inorganic powders, turbochargers, high temperature insulators, spray nozzles and thread guides. Such parts include for example, for ceramic Inorganic powders, optical cable ferrules, ski pole tips, haircutting blades, airfoil cores, piezoelectric (e.g., lead zircon titanate, PZT) parts, oxygen sensors and spray nozzles.

BINDER COMPOSITIONS FOR PRESS & SINTER APPLICATIONS

The binder composition of the present invention may also be used for press & sinter applications. In press & sinter application, the inorganic powder loading is considerably higher than in PIM. The trade-off for the higher loading is the limitation that the parts made by a press & sinter process are quite limited in complexity. In fact, press & sinter can be considered to be limited to quite simple parts. The types of inorganic powders which can be used in press & sinter applications are more limited, due to the requirement that the powders be sufficiently malleable and compactable to be useable in press & sinter applications. Powders having a high hardness values, such as for example WC, are generally not useable in press & sinter applications. The hardness value becomes an issue in press & sinter applications due to the low binder loadings used in press & sinter as compared to PIM.

In a press & sinter application, the loading of the binder composition in the green composition is typically in the range from about 1% by volume to about 10% by volume of the green composition from which the part will be formed. (As with PIM applications, the green composition is measured on a volume basis, with the loadings expressed in volume percentages.) In one embodiment, the loading of the binder composition is 1% by volume. In one embodiment, the loading of the binder composition is 2% by volume. In one embodiment, the loading of the binder composition is 3% by volume. In one embodiment, the loading of the binder composition is 4% by volume. In a press & sinter process, the green composition is pressed into the desired shape by means of, e.g., a hydraulic press. Once the part is pressed into its shape, it has a green strength in the range from about 1,000 psi (about 703,070 Kg/m$^2$) to about 4,000 psi (about 2,812,278 Kg/m$^2$). The part is then sintered.

For a press & sinter application, the binder composition according to the present invention has the following ranges of components (as previously, the binder composition is prepared on a weight by weight percentage bases (wt %)).

| | |
|---|---|
| polycarbonate polymer | 10–50 wt % |
| ethylenebisamide wax | 30–70 wt % |
| guanidine wetting agent | 5–30 wt % |

For press & sinter applications, the foregoing descriptions with respect to the selection of polycarbonate polymer, ethylenebisamide wax and guanidine wetting agent continue to apply. Thus, the acid used to form the reaction product of guanidine and acid is selected on the basis of the isoelectric point of the inorganic powder. Similarly, the same range of inorganic powders can be used, as long as these are useable in a press & sinter application.

In view of the foregoing description, it is apparent that the present invention provides a new and improved binder which is formed and/or used in accordance with a new and improved method.

What is claimed is:

1. A method for forming a part by powder injection molding including:
   (a) forming a green composition comprising a binder composition and an inorganic powder, wherein the binder composition comprises a polycarbonate polymer, an ethylenebisamide wax, and a guanidine wetting agent;
   (b) heating the green composition to debind the green composition by reverse debinding.

2. The method of claim 1 wherein the inorganic powder is selected from a metal powder, a metal oxide powder, an intermetallic powder and a ceramic powder.

3. The method of claim 1, wherein the guanidine wetting agent is a reaction product of guanidine and an acid selected from organic acid, a fatty acid and an alkyl sulfonic acid.

4. The method of claim 1, wherein the polycarbonate polymer has a number average molecular weight in the range from about 35,000 to about 65,000.

5. The method of claim 1, wherein the ethylenebisamide wax has a discrete melting point in the range from about 130° C. to about 150° C.

6. The method of claim 1, wherein the guanidine wetting agent is present in the range from about 5 wt % to about 30 wt % of the binder composition, the polycarbonate polymer is present in the range from about 30 wt % to about 85 wt % of the binder composition, and the ethylenebisamide wax is present in the range from about 10 wt % to about 40 wt % of the binder composition.

7. The method of claim 1, wherein the binder composition is present in an amount in the range from about 30 vol % to about 60 vol % of the green composition and the inorganic powder is present in an amount from about 70 vol % to about 40 vol % of the green composition.

8. The method of claim 1, wherein step (b) includes a plurality of temperature increases to elevated temperatures.

9. The method of claim 8, wherein each of the elevated temperatures are maintained constant for a period of time.

10. The method of claim 8, wherein the elevated temperatures correspond to temperatures at which individual ingredients of the binder composition are debound.

11. The method of claim 8, wherein a first elevated temperature corresponds to the debinding temperature of the polycarbonate polymer, a second elevated temperature corresponds to the debinding temperature of the ethylenebisamide wax, and a third elevated temperature corresponds to the debinding temperature of the guanidine wetting agent.

12. The method of claim 11, wherein the third elevated temperature is higher than the second elevated temperature, and the second elevated temperature is higher than the first elevated temperature.

13. The method of claim 1, further comprising a step of injecting the green composition into a mold for powder injection molding.

14. The method of claim 1, further comprising a step of gravity feeding the green composition into a mold for press and sinter molding.

15. The method of claim 1, further comprising a step of heating the part to a temperature at which the inorganic powder is sintered.

16. A method for forming a part by powder injection molding, comprising:
   (a) forming a green composition comprising a binder composition and an inorganic powder, wherein the binder composition comprises a polycarbonate polymer, an ethylenebisamide wax, and a guanidine wetting agent;
   (b) transferring the flowable green composition into a mold for a part;
   (c) heating the part to debind the green composition by reverse debinding;
   (d) heating the part to a temperature at which the powder is sintered.

17. A method for forming a part by powder injection molding, comprising:
   (a) forming a green composition comprising a binder composition and an inorganic powder, wherein the binder composition comprises a polycarbonate polymer, an ethylenebisamide wax, and a guanidine wetting agent;
   (b) transferring the flowable green composition into a mold for a part by injecting the green composition into the mold for powder injection molding;

(c) heating the part to a plurality of elevated temperatures to debind the green composition by reverse debinding, wherein a first elevated temperature corresponds to the debinding temperature of the polycarbonate polymer, a second elevated temperature corresponds to the debinding temperature of the ethylenebisamide wax, and a third elevated temperature corresponds to the debinding temperature of the guanidine wetting agent.

(d) heating the part to a temperature at which the powder is sintered.

* * * * *

UNITED STATES PATENT AND TRADEMARK OFFICE
CERTIFICATE OF CORRECTION

PATENT NO.   : 6,204,316 B1                                    Page 1 of 1
DATED        : March 20, 2001
INVENTOR(S)  : Karl-Heinz Schofalvi It is certified that error appears in the above-identified patent and that said Letters Patent is hereby corrected as shown below:

The corrected figure at column 8, line 18 is:

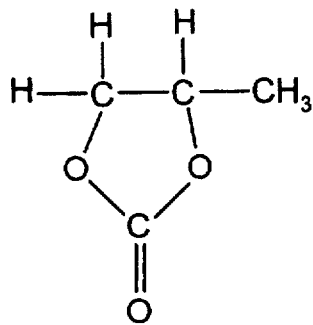

Signed and Sealed this

Twenty-fifth Day of September, 2001

*Attest:*

*Attesting Officer*

NICHOLAS P. GODICI
*Acting Director of the United States Patent and Trademark Office*